(12) United States Patent
Ogawa (10) Patent No.: US 10,704,664 B2
(45) Date of Patent: Jul. 7, 2020

(54) DIFFERENTIAL GEAR DEVICE

(71) Applicant: TOYOTA JIDOSHA KABUSHIKI KAISHA, Toyota-shi, Aichi (JP)

(72) Inventor: Yukitoshi Ogawa, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 92 days.

(21) Appl. No.: 16/177,748

(22) Filed: Nov. 1, 2018

(65) Prior Publication Data

US 2019/0136954 A1 May 9, 2019

(30) Foreign Application Priority Data

Nov. 4, 2017 (JP) ................. 2017-213358

(51) Int. Cl.
*F16H 48/38* (2012.01)
*F16H 48/40* (2012.01)
*F16H 48/08* (2006.01)

(52) U.S. Cl.
CPC ............ *F16H 48/38* (2013.01); *F16H 48/08* (2013.01); *F16H 48/40* (2013.01); *F16H 2048/085* (2013.01); *F16H 2048/387* (2013.01)

(58) Field of Classification Search
CPC .... F16H 2048/387; F16H 48/38; F16H 48/40; F16H 48/08; F16H 2048/085
USPC ........................................... 411/533
See application file for complete search history.

(56) References Cited

U.S. PATENT DOCUMENTS

| 3,872,741 | A | * | 3/1975 | Berchtold | ............... | F16H 48/08 475/246 |
| 4,812,094 | A | * | 3/1989 | Grube | ..................... | F16B 39/10 411/134 |
| 4,860,513 | A | * | 8/1989 | Whitman | .............. | E04D 3/3603 52/410 |
| 4,930,959 | A | * | 6/1990 | Jagelid | .................. | E06B 1/6076 411/107 |
| 4,978,329 | A | * | 12/1990 | Yasui | ..................... | F16H 48/08 475/223 |

(Continued)

FOREIGN PATENT DOCUMENTS

| FR | 2879694 A1 | * | 6/2006 | ............ | F16H 48/08 |
| JP | 58137643 A | * | 8/1983 | ............. | F16H 48/08 |

(Continued)

*Primary Examiner* — Sherry L Estremsky
(74) *Attorney, Agent, or Firm* — Oliff PLC (57) ABSTRACT

In a differential gear device including: a differential casing rotatable about an axis and having a pair of through-holes; a pinion shaft accommodated within the differential casing and extending through the through-holes; a pair of pinion gears fitted on an outer circumferential surface of the pinion shaft such that the pinion gears are rotatable relative to the pinion shaft; a pair of side gears meshing with the pinion gears; and a pair of pinion washers interposed between the differential casing and the respective pinion gears, each of the pinion washers has a retainer structure partially inserted through a gap formed between an inner circumferential surface of a corresponding one of the through-holes and the outer circumferential surface of the pinion shaft. The retainer structure is held in contact with a corresponding axial end face of the pinion shaft, to prevent axial movements of the pinion shaft.

5 Claims, 4 Drawing Sheets

(56) References Cited

U.S. PATENT DOCUMENTS 5,980,417 A * 11/1999 Wopshall, Jr. .......... F16H 48/08
                                                          475/230
6,908,276 B2 * 6/2005 Dohm .................... F16B 37/044
                                                          411/156

FOREIGN PATENT DOCUMENTS

| JP | S63-091746 U | | 6/1988 | |
|----|--------------|---|--------|---|
| JP | H01-098952 U | | 7/1989 | |
| JP | H08-135756 A | | 5/1996 | |
| JP | 10246308 A | * | 9/1998 | ............. F16H 48/22 |
| JP | 2004-068873 A | | 3/2004 | |
| JP | 2008-128440 A | | 6/2008 | |
| JP | 2009-166140 A | | 7/2009 | |

* cited by examiner

DIFFERENTIAL GEAR DEVICE

This application claims priority from Japanese Patent Application No. 2017-213358 filed on Nov. 4, 2017, the disclosure of which is herein incorporated by reference in its entirety.

FIELD OF THE INVENTION

The present invention relates to a retaining mechanism for fixing a pinion shaft in a differential gear device.

BACKGROUND OF THE INVENTION

There is well known a differential gear device including: a differential casing rotatable about an axis and having a pair of through-holes; a pinion shaft accommodated within the differential casing, so as to extend through the through-holes; a pair of pinion gears fitted on an outer circumferential surface of the pinion shaft such that the pinion gears are rotatable relative to the pinion shaft; a pair of side gears meshing with the pinion gears; and a pair of pinion washers interposed between the differential casing and the respective pinion gears. JP-2008-128440A discloses an example of such a differential gear device. In the differential gear device disclosed in this publication, each of the differential casing and the pinion shaft has pin holes, and the pinion shaft extending through the through-holes of the differential casing is fixed to the differential casing, with fixing pins each of which is inserted in the pin holes. JP-63-91746U, JP-1-98952U, JP-2004-68873A, JP-2009-166140A and JP-8-135756A disclose similar prior art differential gear devices of the type as described above.

In the differential gear device wherein the pinion shaft is fixed to the differential casing with the fixing pins inserted in the pin holes formed in the differential casing and the pinion shaft, as disclosed in JP-2008-128440A, the differential casing is required to have a wall thickness large enough to form the pin holes therein. On the other hand, the wall thickness of the differential casing is required to be reduced for reducing the weight and cost of manufacture of the differential gear device. In this respect, there has been a need to improve the prior art differential gear device.

SUMMARY OF THE INVENTION

The present invention was made in view of the background art described above. It is therefore an object of the present invention to provide a differential gear device which permits its pinion shaft to be fixed to its differential casing, while permitting the differential casing to have a reduced wall thickness.

The object indicated above is achieved according to the following modes of the present invention:

According to a first mode of the invention, there is provided a differential gear device comprising: a differential casing rotatable about an axis and having a pair of through-holes; a pinion shaft accommodated within the differential casing, so as to extend through the through-holes; a pair of pinion gears fitted on an outer circumferential surface of the pinion shaft such that the pinion gears are rotatable relative to the pinion shaft; a pair of side gears meshing with the pinion gears; and a pair of pinion washers interposed between the differential casing and the respective pinion gears, and wherein each of the pair of pinion washers has a retainer structure partially inserted through a gap formed between an inner circumferential surface of a corresponding one of the pair of through-holes of the differential casing and the outer circumferential surface of the pinion shaft. The retainer structure is held in contact with a corresponding one of opposite axial end faces of the pinion shaft, to prevent axial movements of the pinion shaft through the through-holes.

According to a second mode of the invention, the pinion shaft comprises at least one flat surface parallel to an axis of the pinion shaft and formed in at least each of axial portions of the pinion shaft extending through the respective through-holes formed through the differential casing, and the retainer structure of each pinion washer includes at least one leg portion each extending along the corresponding flat surface of the pinion shaft, and at least one pawl each of which is a bent portion of the corresponding leg portion and held in contact with the corresponding axial end face of the pinion shaft.

According to a third mode of the invention, the at least one flat surface of the pinion shaft are a pair of parallel flat surfaces which are opposite to each other with regard to an axial direction of the pinion shaft, and the at least one leg portion are a pair of planar portions held in surface contact with the respective parallel flat surfaces of the pinion shaft.

According to a fourth mode of the invention, the circumferential surface of each of the pair of through-holes of the differential casing has at least one groove accommodating the respective leg portions of each of the pinion washers.

In the differential gear device according to the first mode of the invention, the retainer structure of each pinion washer is held in contact with the corresponding axial end face of the pinion shaft, to prevent the axial movements of the pinion shaft through the through-holes formed through the differential casing. Thus, the pinion shaft is fixed by the retainer structures of the pinion washers to the differential casing, without using fixing pins, such that the pinion shaft cannot be removed from the differential casing, whereby the required wall thickness of the differential casing can be reduced.

In the differential gear device according to the second mode of the invention, the pinion shaft comprises the at least one flat surface, so that the at least one leg portion of each pinion washer is not required to be formed to have an arcuate cross sectional shape following a circular cross sectional shape of the pinion shaft. Accordingly, the pinion washers can be easily formed. In addition, the at least one pawl of the retainer structure can be easily formed such that each pawl is the bent portion of the corresponding leg portion parallel to the corresponding flat surface of the pinion shaft.

In the differential gear device according to the third mode of the invention wherein the two parallel flat surfaces of the pinion shaft are opposite to each other with regard to the axial direction of the pinion shaft, and the two leg portions in the form of the planar portions are held in surface contact with the respective parallel flat surfaces of the pinion shaft, the two pawls of each of the retainer structures of the pair of pinion washers are located opposite to each other with regard to the axial direction of the pinion shaft, and are held in contact with the corresponding axial end face of the pinion shaft, so that the removal of the pinion shaft from the differential casing can be effectively prevented.

In the differential gear device according to the fourth mode of the invention wherein the inner circumferential surface of each of the pair of through-holes of the differential casing has the at least one groove accommodating the respective leg portions of each of the pinion washers, the leg portions of each pinion washer are held in engagement with both the parallel flat surfaces of the pinion shaft and the at least one groove of the differential casing. Accordingly, the pinion shaft is not rotatable relative to the differential casing, since the leg portions of the pinion washers held in contact with the parallel flat surfaces of the pinion shaft are accommodated in the grooves formed in the inner circumferential surfaces of the through-holes of the differential casing.

DETAILED DESCRIPTION OF PREFERRED EMBODIMENTS

A preferred embodiment of the present invention will be described in detail by reference to the drawings. It is to be understood that the drawings showing the embodiment are simplified or transformed as needed, and do not necessarily accurately represent dimensions and shapes of various elements of the embodiment.

Embodiment

Figure 1:
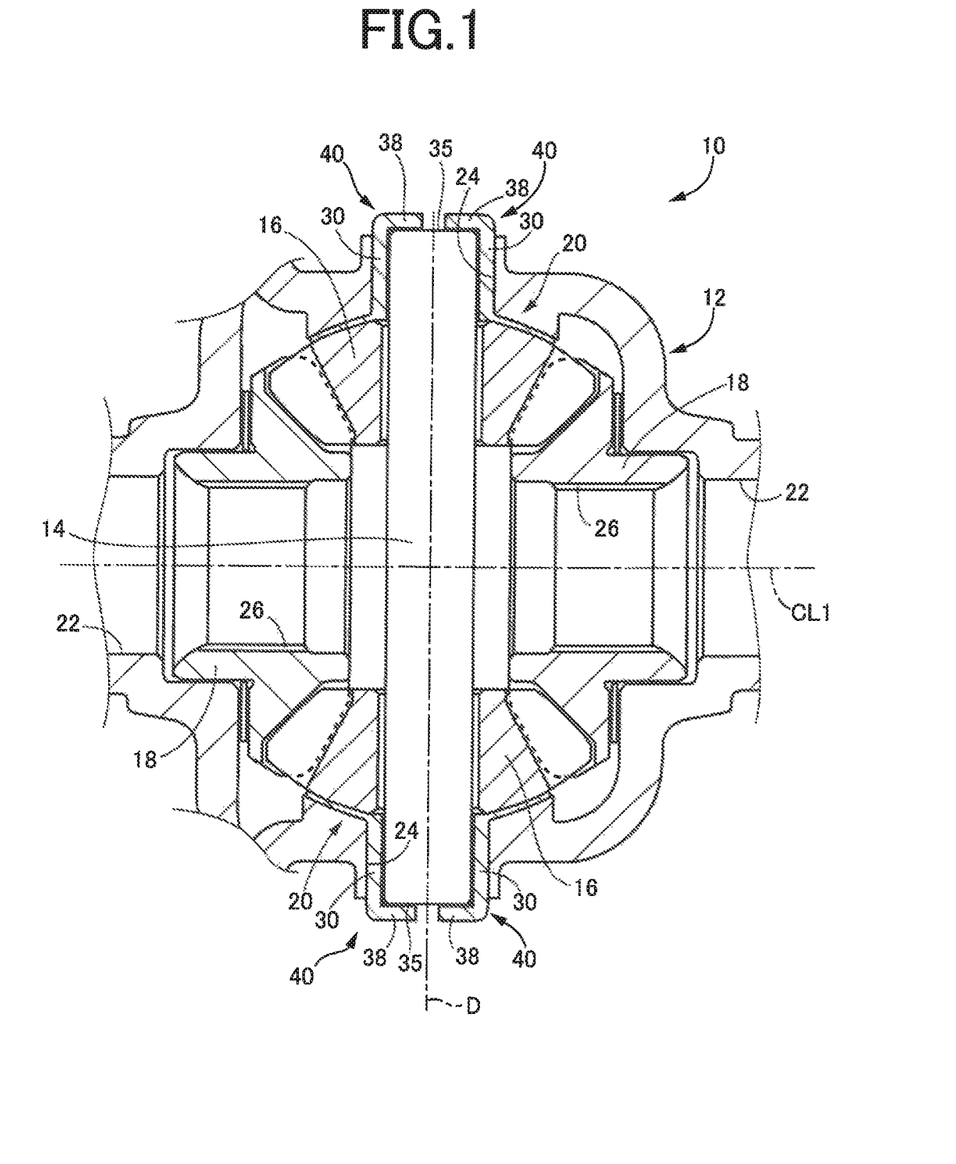
FIG. 1 is a cross sectional view of a differential gear device according to one embodiment of this invention.

Reference is first made to FIG. 1, which is the cross sectional view of a differential gear device 10 constructed according to one embodiment of this invention. As shown in FIG. 1, the differential gear device 10 is a differential gear device well known in the art, which is configured to transmit a vehicle drive force to a pair of right and left drive wheels of a vehicle, while permitting a difference between rotating speeds of the two drive wheels.

The differential gear device 10 includes: a differential casing 12 rotatable about an axis CL1; a pinion shaft 14 accommodated within the differential casing 12 and fixed at its opposite axial end portions to the differential casing 12; a pair of pinion gears 16 fitted on an outer circumferential surface of the pinion shaft 14 such that the pinion gears 16 are rotatable relative to the pinion shaft 14; a pair of side gears 18 meshing with the pinion gears 16; and a pair of pinion washers 20 interposed between the differential casing 12 and the respective pinion gears 16.

The differential casing 12 is a hollow housing structure, and is rotated about the axis CL1 with the vehicle drive force transmitted thereto via a ring gear not shown. The differential casing 12 has a pair of axle holes (bosses) 22 in its opposite axial end portions, so that a pair of drive axles not shown are fitted in the respective axle holes 22, so as to extend in the direction of the axis CL1. The differential casing 12 also has a pair of through-holes 24 through which the pinion shaft 14 extends in a direction perpendicular to the axis CL1.

The pinion shaft 14 is an elongate substantially cylindrical member which has opposite axial end portions extending through the respective through-holes 24 and which is fixed at its axial end portions to the differential casing 12, so as to prevent axial movements of the pinion shaft 14 through the through-holes 24. A retaining mechanism for fixing the pinion shaft 14 to the differential casing 12 will be described in detail. When the differential casing 12 is rotated about the axis CL1, the pinion shaft 14 is also rotated about the axis CL1.

The pinion gears 16 are fitted on the outer circumferential surface of the pinion shaft 14 such that the pinion gears 16 are rotatable relative to the pinion shaft 14, about an axis D which is a centerline of the pinion shaft 14.

Each of the pair of side gears 18 is an annular member rotatable about the axis CL1. Each side gear 18 has an externally formed bevel gear meshing with the pinion gears 16, and internally formed spline teeth 26 splined to a corresponding one of the pair of drive axles, so that a rotary motion of the side gear 18 is transmitted through the corresponding drive axle to a corresponding one of the right and left drive wheels.

The retaining mechanism for fixing the pinion shaft 14 to the differential casing 12 will then be described.

Figure 2:
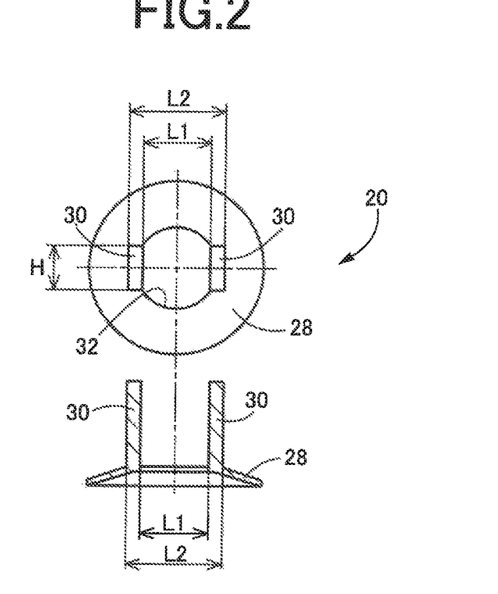
FIG. 2 is a view showing a pinion washer of the differential gear device of FIG. 1, before the pinion washer is installed in position.

As shown in FIG. 1, the pinion washers 20 are interposed between the differential casing 12 and the respective pinion gears 16. FIG. 2 is the view showing the pinion washer 20 before it is installed in position in the differential gear device 10. The pinion washer 20 before its installation includes an annular disc portion 28 to be interposed between the differential casing 12 and the corresponding pinion gear 16 in the direction of the axis D of the pinion shaft 14, and a pair of leg portions 30 extending from the annular disc portion 28 in the direction of the axis D. Upon installation of the pinion washer 20, the leg portions 30 are bent at their distal end sections, as shown in FIG. 1. The pinion washers 20 (before their installation) are formed by a pressing operation.

The annular disc portion 28 is an annular dish-like portion having a shape corresponding to a gap between the differential casing 12 and the pinion gear 16. The annular disc portion 28 has a central pinion shaft hole 32 through which the pinion shaft 14 extends.

Each of the pair of leg portions 30 is a planar portion which extends from an edge of the central pinion shaft hole 32 of the annular disc portion 28 in the direction of the axis D, and which has a width H in a diametric direction of the annular disc portion 28, as shown in FIG. 2. The leg portions 30 are formed so as to be opposite to each other in a diametric direction of the pinion shaft hole 32, so that the leg portions 30 are opposite to each other with respect to an axial direction of the pinion shaft 14 such that the leg portions 30 are held in surface contact with respective parallel flat surfaces 34 (described below) of the pinion shaft 14 when the pinion washer 20 is installed in position in the differential gear device 10. Thus, the pair of leg portions 30 in the form of the planar portions are parallel to each other. As also shown in FIG. 2, the leg portions 30 are formed so as to have an inner distance L1 between their inner surfaces opposite to each other, and an outer distance L2 between their outer surfaces opposite to the inner surfaces.

Figure 3:
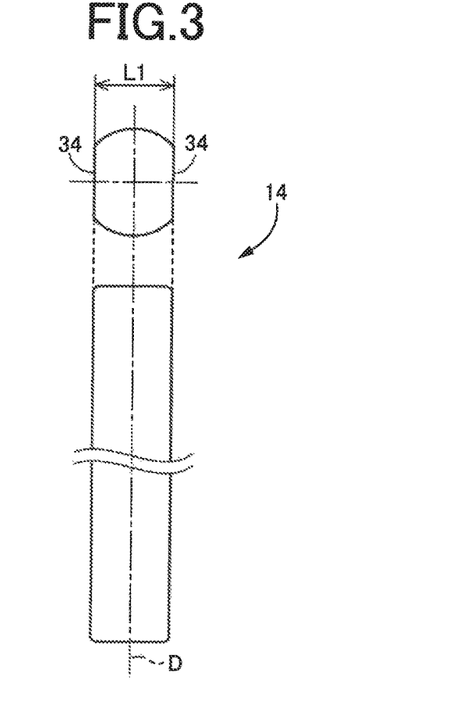
FIG. 3 is a view showing a pinion shaft of the differential gear device of FIG. 1, before the pinion shaft is installed in position.

FIG. 3 is the view showing the pinion shaft 14 before it is installed in position in the differential gear device 10. As described above and as shown in FIG. 3, the pinion shaft 14 is the elongate substantially cylindrical member, which has the pair of parallel flat surfaces 34 on the outer circumferential surface referred to above. The parallel flat surfaces 34 are parallel to the axis D of the pinion shaft 14 and therefore parallel to each other, and are opposite to each other with respect to the axial direction of the pinion shaft 14. The parallel flat surfaces 34 are formed such that a distance therebetween is equal to the inner distance L1 of the leg portions 30, so that the leg portions 30 of the pinion washers 20 are held in surface contact with the respective parallel flat surfaces 34. While it is described herein that the distance between the parallel flat surfaces 34 is equal to the inner distance L1 of the leg portions 30, the distance between the parallel flat surfaces 34 is set to be slightly smaller than the inner distance L1, in a strict sense, so that the leg portions 30 can be fitted on and in surface contact with the parallel flat surfaces 34 when the pinion washers 20 are installed in position.

Figure 4:
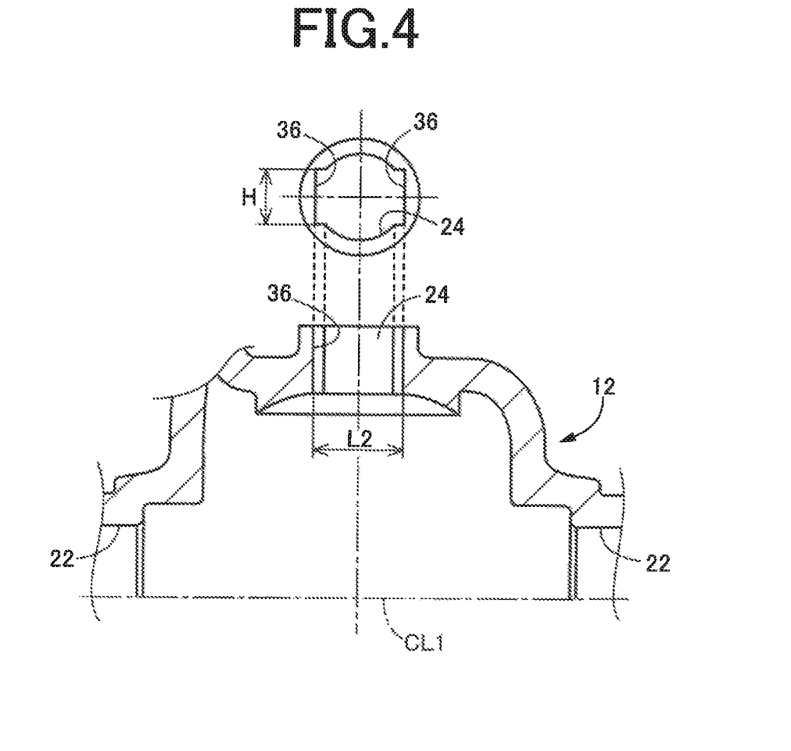
FIG. 4 is a cross sectional view of a differential casing of the differential gear device of FIG. 1.

FIG. 4 is the cross sectional view of the differential casing 12. It is noted that a lower half of the differential casing 12 on a lower side of the axis CL1 as seen in FIG. 4 is not shown in this figure. As shown in FIG. 4, an inner circumferential surface of each of the through-holes 24 of the differential casing 12 has a pair of grooves 36 formed through a wall thickness of the differential casing 12. Each of the grooves 36 has a rectangular shape as seen in a direction of a centerline of the through-hole 24 (as seen in the direction of the axis D of the pinion shaft 14), so that the corresponding leg portion 30 is fitted in the rectangular groove 36 when the pinion washer 20 is installed in position. As shown in FIG. 4, the rectangular groove 36 has a width equal to the width H of the leg portion 30.

The pair of rectangular grooves 36 are formed so as to be opposite to each other in a diametric direction of the through-hole 24. Accordingly, bottom surfaces of the two rectangular grooves 36 are opposite to each other in the diametric direction of the through-hole 24, and are parallel to each other. Further, a distance between the bottom surfaces of the rectangular grooves 36 is set to be equal to the outer distance L2 of the pair of leg portions 30, so that the leg portions 30 are fitted in the respective rectangular grooves 36.

Figure 5:
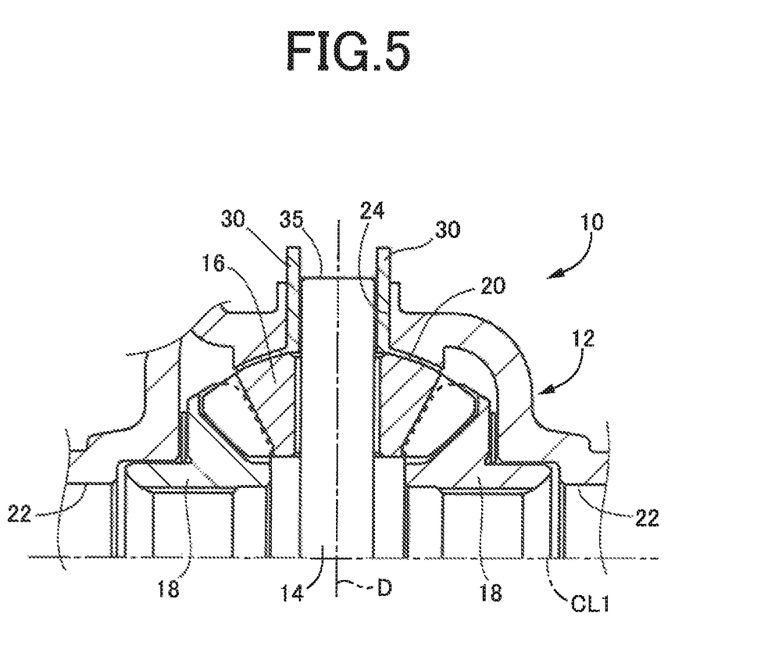
FIG. 5 is a cross sectional view of the differential gear device in the process of its assembling.

FIG. 5 is the cross sectional view of the differential gear device 10 in the process of its assembling. When the differential gear device 10 is assembled, the pinion gears 16, the side gears 18, the pinion shaft 14 and the pinion washers 20 are assembled together such that the leg portions 30 of each pinion washer 20 shown in FIG. 2 are fitted in the rectangular grooves 36 formed in the inner circumferential surface of the corresponding through-hole 24 of the differential casing 12. The pinion shaft 14 is installed so as to extend through the two through-holes 24 such that the two parallel flat surfaces 34 of the pinion shaft 14 are held in surface contact with the respective leg portions 30 of the pinion washers 20.

At this time, the leg portions 30 of each pinion washer 20 extend through a gap formed between the differential casing 12 and the pinion shaft 14, more specifically, through a gap formed between the parallel flat surfaces 34 of the pinion shaft 14 and the bottom surfaces of the rectangular grooves 36 of the differential casing 12, such that distal axial end sections of the leg portions 30 project from the through-hole 24. In this state, the distal axial end sections of the leg portions 30 are bent toward each other in a radially inward direction of the pinion washer 20, so that a pair of pawls 38 held in contact with a corresponding one of opposite axial end faces 35 are formed, as shown in FIG. 1. The two leg portions 30 and the two pawls 38 cooperate to constitute a pair of retainer portions 40 of each pinion washer 20, each of which is partially inserted through the gap between the inner circumferential surface of the corresponding through-hole 24 and the parallel flat surfaces 34 of the pinion shaft 14, as shown in FIG. 1. The retainer portions 40 of the pinion washers 20 are held in contact with the respective axial end faces 35 of the pinion shaf 14, to prevent axial movements of the pinion shaft 14 through the through-holes 24. Each of the retainer portions 40 is L-shaped as seen in the cross sectional view of FIG. 1. The pair of retainer portions 40 constitute a retainer structure to prevent the axial movements of the pinion shaft 14 through the through-holes 24.

Namely, the retainer structure (pair of retainer portions 40) of each pinion washer 20 installed in place in the differential gear device 10 comprises the pair of leg portions 30 held in contact with the parallel flat surfaces 34 of the pinion shaft 14 and fitted in the rectangular grooves 36 formed in the differential casing 12, and the pair of pawls 38 each of which is a bent portion of the respective leg portions 30 and held in contact with the axial end faces 35 of the pinion shaft 14.

The pawls 38 of the retainer portions 40 which are held in contact (abutting contact) with the axial end faces 35 of the pinion shaft 14 function to prevent the axial movements of the pinion shaft 14 in the direction of its axis D, and consequent removal of the pinion shaft 14 from the differential casing 12. Namely, the pinion shaft 14 is fixed by the pinion washers 20 to the differential casing 12, so as to prevent the axial movements of the pinion shaft 14 through the through-holes 24. Further, the two retainer portions 40 are located opposite to each other in the circumferentially diametric direction of the pinion shaft 14, so that the pinion shaft 14 is suitably fixed to the differential casing 12, so as to effectively prevent the axial movements of the pinion shaft 14 relative to the differential casing 12. Thus, the pinion shaft 14 is fixed to the differential casing 12, without using fixing pins, such that the pinion shaft 14 cannot be removed from the differential casing 12, whereby the required wall thickness of the differential casing 12 can be reduced.

In addition, the pair of leg portions 30 of each pinion washer 20 are held in contact with the respective parallel flat surfaces 34 of the pinion shaft 14 installed in position, so that the pinion washer 20 is not rotatable relative to the pinion shaft 14. Further, the leg portions 30 of the pinion washers 20 installed in position are fitted in the respective rectangular grooves 36, so that the pinion washers 20 are not rotatable within the through-holes 24 of the differential casing 12. Thus, the pinion shaft 14 is fixed to the differential casing 12 through the pinion washers 20 such that the pinion shaft 14 is not rotatable within the through-holes 24. Accordingly, the pinion washers 20 prevent sliding contact between the outer circumferential surface of the pinion shaft 14 and the inner circumferential surface of the through-holes 24 of the differential casing 12, making it possible to prevent deterioration of durability of the differential gear device 10 due to wearing of those outer and inner circumferential surfaces caused by their sliding contact through the pinion washers 20.

In the differential gear device 10 according to the present embodiment of the invention, the retainer structure comprising the pair of retainer portions 40 of each of the pinion washers 20 is held in contact with the corresponding axial end face 35 of the pinion shaft 14, to prevent the axial movements of the pinion shaft 14 through the through-holes 24 formed through the differential casing 12. Thus, the pinion shaft 14 is fixed by the retainer structures of the pinion washers 20 to the differential casing 12, without using fixing pins, such that the pinion shaft 14 cannot be removed from the differential casing 12, whereby the required wall thickness of the differential casing 12 can be reduced.

The present differential gear device 10 is further configured such that the pinion shaft 14 has the two parallel flat surfaces 34, so that the leg portions 30 of each pinion washer 20 are not required to be formed to have an arcuate cross sectional shape following a circular cross sectional shape of the pinion shaft 14. Accordingly, the pinion washers 20 can be easily formed. In addition, the pawls 38 of the retainer structure in the form of the retainer portions 40 can be easily formed such that the pawls 38 are the bent portions of the leg portions 30 parallel to the parallel flat surfaces 34 of the pinion shaft 14.

The present differential gear device 10 is also configured such that the two parallel flat surfaces 34 of the pinion shaft 14 are opposite to each other with respect to the axial direction of the pinion shaft 14, and the two pair of leg portions 30 in the form of the planar portions are held in surface contact with the respective parallel flat surfaces 34 of the pinion shaft 14, which are opposite to each other with respect to the axial direction of the pinion shaft 14, and the two pawls 38 of each of the retainer structures in the form of the retainer portions 40 of the pair of pinion washers 20 are located opposite to each other with respect to the axial direction of the pinion shaft 14, and are held in contact with the corresponding axial end face 35 of the pinion shaft 14, so that the removal of the pinion shaft 14 from the differential casing 12 can be effectively prevented.

The differential gear device 10 is further configured such that the inner circumferential surface of each of the pair of through-holes 24 of the differential casing 12 has the pair of grooves 36 accommodating the respective leg portions 30 of each of the pinion washers 20, so that the pinion washers 20 are prevented from being rotated within the through-holes 24 formed in the differential casing 12. Further, the pair of leg portions 30 of each pinion washer 20 are held in engagement with the parallel flat surfaces 34 of the pinion shaft 14, so that the pinion washers 20 and the pinion shaft 14 are prevented from being rotated relative to each other. Accordingly, the pinion shaft 14 is not rotatable relative to the differential casing 12, since the leg portions 30 of the pinion washers 20 held in contact with the parallel flat surfaces 34 of the pinion shaft 14 are accommodated in the grooves 36 formed in the inner circumferential surfaces of the through-holes 24 of the differential casing 12. Thus, it is possible to reduce amounts of wearing of the outer circumferential surface of the pinion shaft 14 and the inner circumferential surfaces of the through-holes 24 of the differential casing 12, which would take place due to sliding contact between the above-indicated outer and inner circumferential surfaces through the pinion washers 20.

While the preferred embodiment of this invention has been described above in detail by reference to the drawings, it is to be understood that the invention may be otherwise embodied.

In the illustrated embodiment described above, each pinion washer 20 has the two leg portions 30, the pinion shaft 14 has the two parallel flat surfaces 34, and each through-hole 24 of the differential casing 12 has the two rectangular grooves 36. However, the present invention requires each pinion washer 20, the pinion shaft 14 and each through-hole 24 to have at least one leg portion 30, corresponding at least one flat surface 34 and corresponding at least one rectangular groove 36, respectively. For instance, the pinion washer 20, the pinion shaft 14 and the through-hole 24 may have three or more leg portions 30, corresponding three or more flat surfaces 34 and corresponding three or more rectangular grooves 36, respectively.

While the leg portions 30 are planar portions in the illustrated embodiment, the leg portions 30 may be arcuate portions following the circumferential surface of the pinion shaft 14, which is not formed with the parallel flat surfaces 34.

In the illustrated embodiment, the differential casing 12 has the rectangular grooves 36. However, the rectangular grooves 36 need not be formed in the circumferential surface of the through-holes 24 of the differential casing 12. Namely, the pinion shaft 14 may be rotatable relative to the through-holes 24, in the absence of the rectangular grooves 36, as long as it does not matter if wearing of the outer circumferential surface of the pinion shaft 14 and the inner circumferential surfaces of the through-holes 24 of the differential casing 12 takes place due to sliding contact between those outer and inner circumferential surfaces through the pinion washers 20.

In the illustrated embodiment, the pinion shaft 14 is formed with the flat surfaces 34. However, the flat surfaces 34 may be replaced by grooves of a suitable depth formed in the circumferential surface of the pinion shaft 14. In this case, the planar leg portions 30 are replaced by leg portions having respective projections fitted in the respective grooves formed in the pinion shaft 14.

Although the two pawls 38 of each of the two retainer portions 40 are formed by bending the distal end sections of the respective leg portions 30 during assembling of the differential gear device 10, in the illustrated embodiment, the pawls 38 may be formed by welding respective pawl members to the distal ends of the leg portions 30, during assembling of the differential gear device 10.

In the illustrated embodiment, the parallel flat surfaces 34 are formed on the pinion shaft 14 over its entire axial length (over its entire dimension in the direction of its centerline D). However, the flat surfaces 34 may be formed in at least each of the axial portions of the pinion shaft 14 extending through the respective through-holes 24 formed through the differential casing 12.

The differential gear device 10 according to the illustrated embodiment is disposed between the right and left drive wheels of the vehicle. However, the principle of the present invention is equally applicable to a center differential gear device disposed between front drive wheels and rear drive wheels of a vehicle, for instance.

While the preferred embodiment and modifications have been described for illustrative purpose only, it is to be understood that the present invention may be embodied with various other changes and improvements, which may occur to those skilled in the art.

NOMENCLATURE OF ELEMENTS

10: Differential gear device
12: Differential casing
14: Pinion shaft
16: Pinion gears
18: Side gears
20: Pinion washers
24: Through-holes
30: Leg portions
34: Parallel flat surfaces
35: Axial end faces
36: Grooves
38: Pawls
40: Retainer portions (Retainer structures)

What is claimed is:

1. A differential gear device comprising: a differential casing rotatable about an axis and having a pair of through-holes; a pinion shaft accommodated within the differential casing, so as to extend through the through-holes; a pair of pinion gears fitted on an outer circumferential surface of the pinion shaft such that the pinion gears are rotatable relative to the pinion shaft; a pair of side gears meshing with the pinion gears; and a pair of pinion washers interposed between the differential casing and the respective pinion gears,     wherein each of the pair of pinion washers has a retainer structure partially inserted through a gap formed between an inner circumferential surface of a corresponding one of the pair of through-holes of the differential casing and the outer circumferential surface of the pinion shaft, the retainer structure being held in contact with a corresponding one of opposite axial end faces of the pinion shaft, to prevent axial movements of the pinion shaft through the through-holes.

2. The differential gear device according to claim 1, wherein the pinion shaft comprises at least one flat surface parallel to an axis of the pinion shaft and formed in at least each of axial portions of the pinion shaft extending through the respective through-holes formed through the differential casing,     and wherein the retainer structure of each pinion washer includes at least one leg portion each extending along the corresponding flat surface of the pinion shaft, and at least one pawl each of which is a bent portion of the corresponding leg portion and held in contact with the corresponding axial end face of the pinion shaft.

3. The differential gear device according to claim 2, wherein the at least one flat surface of the pinion shaft are a pair of parallel flat surfaces which are opposite to each other with regard to an axial direction of the pinion shaft, and the at least one leg portion are a pair of planar portions held in surface contact with the respective parallel flat surfaces of the pinion shaft.

4. The differential gear device according to claim 3, wherein the inner circumferential surface of each of the pair of through-holes of the differential casing has a pair of grooves accommodating the respective leg portions of each of the pinion washers.

5. The differential gear device according to claim 2, wherein the inner circumferential surface of each of the pair of through-holes of the differential casing has at least one groove accommodating the respective leg portions of each of the pinion washers.

\* \* \* \* \*